United States Patent [19]

Cooley

[11] Patent Number: 5,400,903
[45] Date of Patent: Mar. 28, 1995

[54] MULTI-USE NOTEBOOK COMPUTER CARRYING CASE

[75] Inventor: David M. Cooley, Costa Mesa, Calif.

[73] Assignee: AST Research Inc., Irvine, Calif.

[21] Appl. No.: 94,525

[22] Filed: Jul. 20, 1993

[51] Int. Cl.$^6$ .............................................. B65D 85/38
[52] U.S. Cl. ..................................... 206/320; 190/29; 206/305
[58] Field of Search ................... 150/119; 190/19, 21, 190/106, 112, 113, 115, 118, 119, 109–111; 206/305, 320, 576; 364/708

[56] References Cited

U.S. PATENT DOCUMENTS

| | | | |
|---|---|---|---|
| 173,548 | 2/1876 | Large | 190/29 |
| 1,101,490 | 6/1914 | Geissler | 150/119 |
| 1,137,579 | 4/1915 | Cohn | 190/110 |
| 1,947,542 | 2/1934 | Wheary | 190/109 |
| 2,730,152 | 1/1956 | Stakofsky | 150/119 |
| 2,851,076 | 9/1958 | Stakofsky | 150/119 |
| 3,263,779 | 8/1966 | Bailer | 190/110 |
| 4,837,590 | 6/2989 | Sprague | 206/320 |

FOREIGN PATENT DOCUMENTS

| | | | |
|---|---|---|---|
| 0418086 | 9/1925 | Germany | 190/109 |
| 0280373 | 7/1934 | Italy | 190/111 |

OTHER PUBLICATIONS

Article entitled "Beanie Perches Atop Computer to Cut Glare" and photograph, from Orange County edition of Los Angeles Times. Apr. 15, 1992. p. E8.

Primary Examiner—Jimmy G. Foster
Attorney, Agent, or Firm—Knobbe, Martens, Olson & Bear

[57] ABSTRACT

A multi-use notebook computer carrying case includes a top cover member and a bottom cover member. An accordion-like shroud connects the sides of the top and bottom cover members. A bottom tray having a height adjust mechanism is secured within the bottom cover member. The bottom cover member houses a plurality of drawers capable of being extended away from the bottom cover member to expose a storage compartment and provide additional working surface area. The bottom cover member further includes a height adjustable wrist pad. A protective windshield housed within the top cover member, is selectively engageable to protect against a hostile environment.

22 Claims, 6 Drawing Sheets

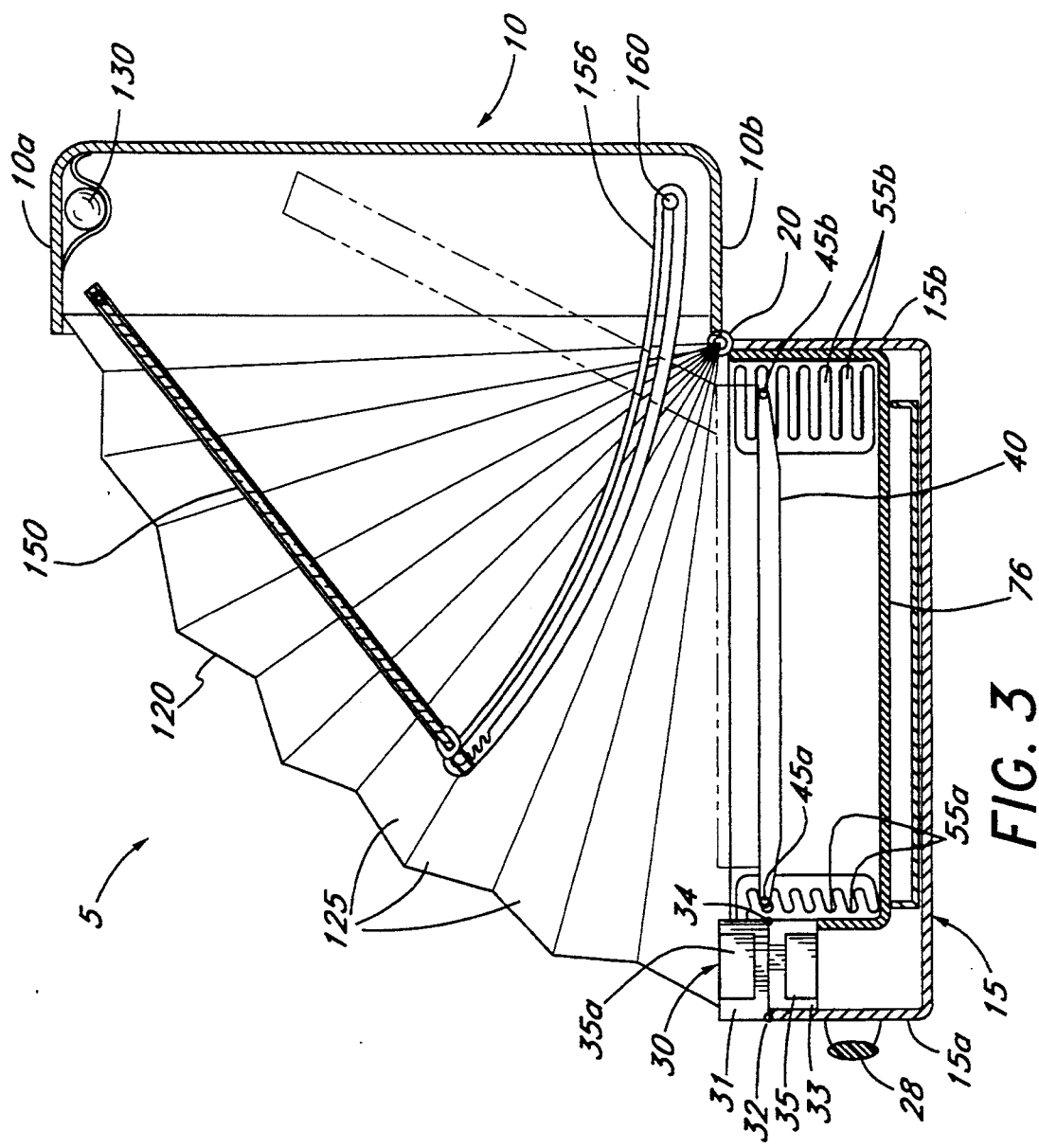
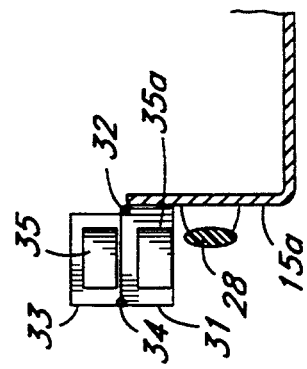

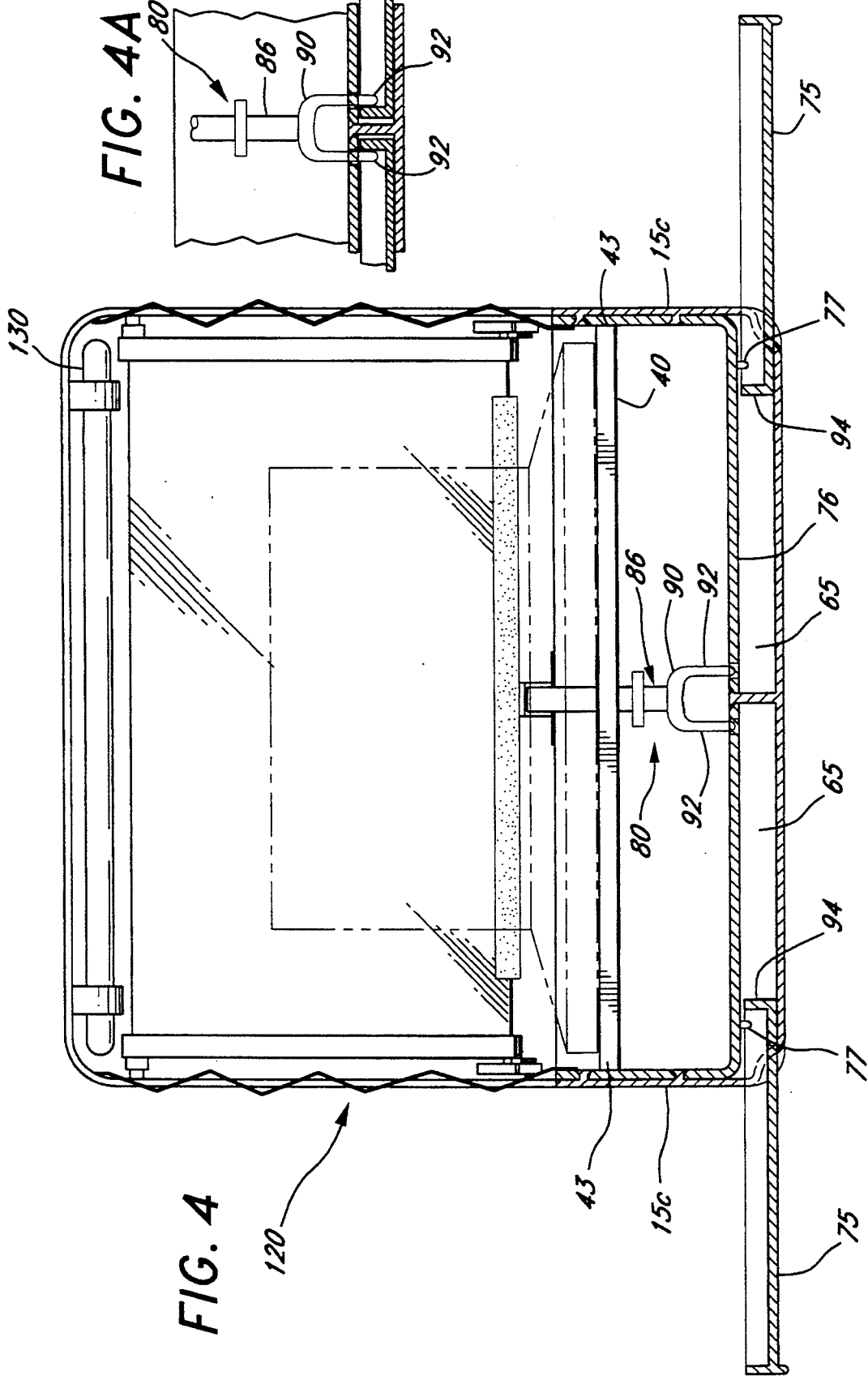

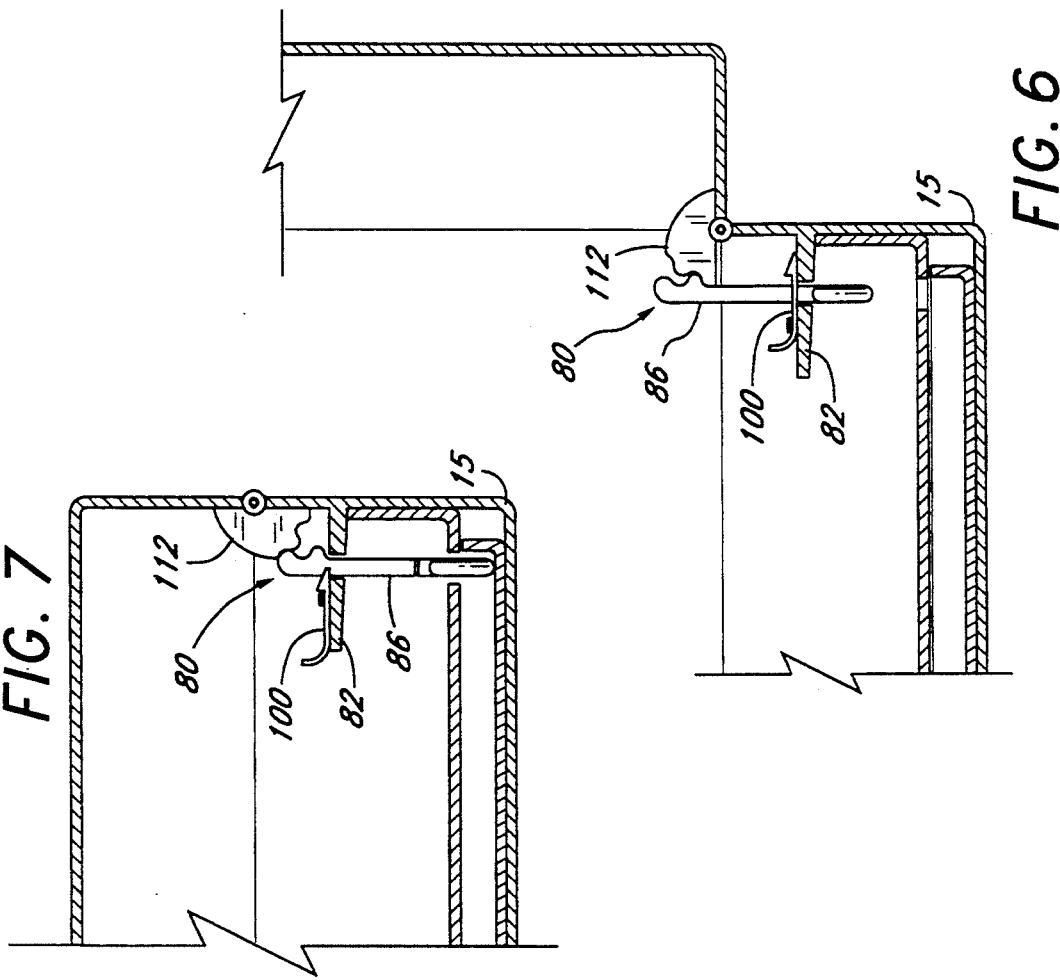
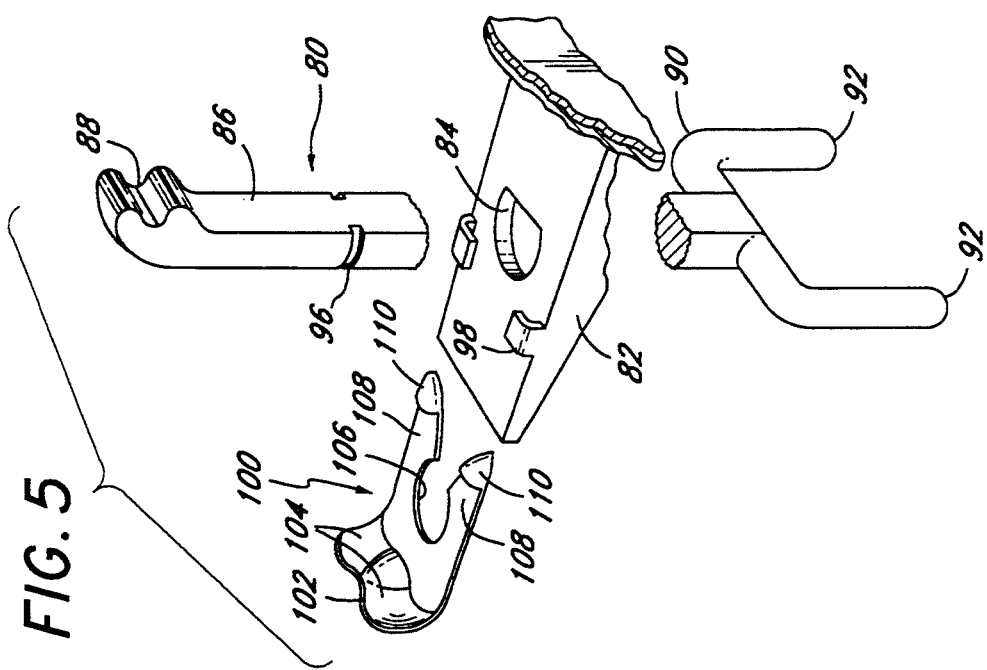

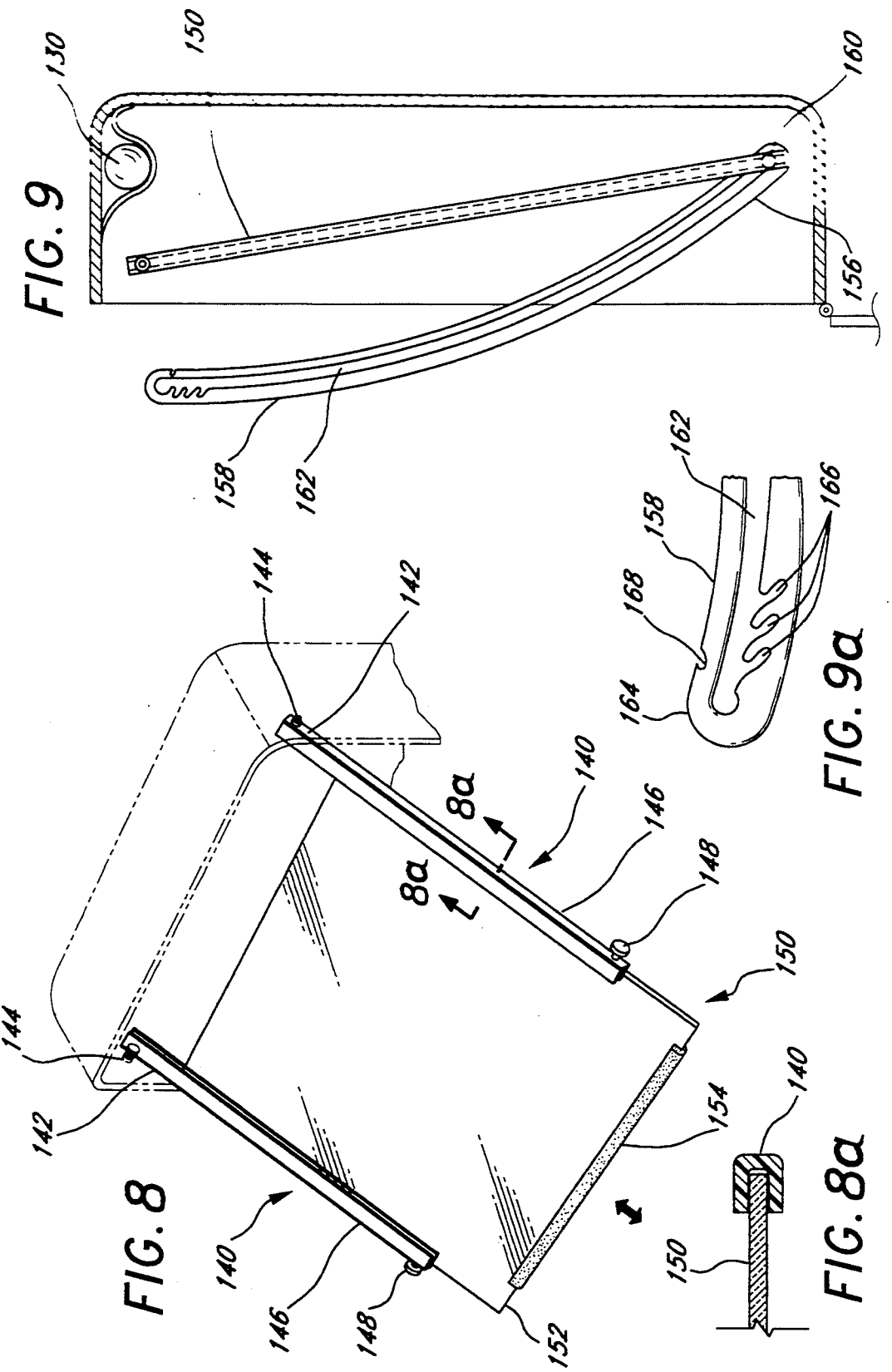

MULTI-USE NOTEBOOK COMPUTER CARRYING CASE

BACKGROUND OF THE INVENTION

1. Field of the Invention

The present invention relates to carrying cases and more particularly to a multi-use carrying case for notebook computers.

2. Description of the Related Art

Notebook computers (also sometimes referred to as laptop computers) are widely used today because of their portability. Notebook computers are frequently used in airplanes and other modes of transportation. Thus, there has developed a need for a carrying case for the notebook computer.

Prior carrying cases comprised, for example, a simple vinyl cover with dimensions larger than the notebook computer to encase the computer within its interior. The prior covers serve the sole purpose of aiding the user in carrying the notebook computer during transit. However, once the notebook computer was in use, the cover was usually set to one side and served no further utility until it was again necessary to carry the computer. Thus, prior covers did not serve to solve many of the problems inherent in using a portable notebook computer.

The advent of the notebook computer has solved many problems; however, it has also created several new problems such as lack of privacy. For instance, notebook computers are frequently used in tight public quarters such as airplanes. Thus, highly confidential material appearing on the notebook computer screen may be viewable to the passengers in the adjacent seats. The prior covers for the notebook computers were of no use in overcoming this problem. Thus, there is a need for a carrying case which would inhibit the eyes of on-looking viewers.

Further, it is sometimes necessary to use the notebook computer in areas with inadequate lighting. The minimum level of light emanating from the computer screen is often inadequate. Thus, there is a need for a carrying case with a supplemental source of lighting.

Notebook computers are also frequently used in outdoor environments. However, an outdoor environment can create several problems. For instance, the glare on the screen from the sun can often impair the user's vision. Once again, because the prior covers were set aside when the notebook computer was in use, the prior covers did nothing to overcome this glare problem. Thus, there is a need for a carrying case which will negate the effects of sun-glare. Further, a windy day can often present problems to a notebook computer. Outdoor debris can blow onto the keyboard and jeopardize the proper functioning of the computer. Thus, there is a need for a carrying case which will protect the computer from the effects of a hostile environment.

Finally, it is often desirable for the user to manipulate the height of the keyboard of the notebook computer to better suit the user's comfort needs. However, the prior notebook covers provided no such function. Thus, there is a need for a carrying case which has a height adjust mechanism.

Thus, there is a need for a notebook computer carrying case which promotes privacy, negates the effects of an outdoor environment, provides supplemental lighting and is adaptable to increase the comfort of the user.

SUMMARY OF THE INVENTION

It is accordingly an object of the present invention to eliminate the noted disadvantages of the prior art computer covers.

It is a further object of the present invention to provide a notebook computer carrying case which will serve as a self-sufficient unit. The multi-use carrying case according to the present invention includes a top cover member and a bottom cover member connected in the back by a hinge assembly and connected along its sides by an accordion-like shroud. The front of the top and bottom cover members are selectively connectable by a latch assembly.

The front of the bottom cover member contains a handle to enable the user to carry the case along with the computer. A height adjustable wrist pad is provided above the handle and within the interior of the bottom cover member to increase the comfort level of the user.

The bottom cover member includes a bottom tray capable of adjusting the height of the notebook computer. The sides of the tray contain a plurality of extensions which mate with a plurality of slots located on each of the four corners of the bottom cover member. Each of the four corners of the bottom cover member has a series of slots aligned along a vertical axis so that the height of the tray can be adjusted. The sides of the bottom cover member further contain a plurality of channels for housing a plurality of drawers. The drawers can slide along the channels from an open position, where the drawers are displaced from the bottom cover member, to a closed position, where the drawers are housed within the bottom cover member. A lock and release mechanism prevents the drawers from inadvertently opening during transit and prevents the top cover member from inadvertently closing during operation.

The interior of the top cover member includes a supplemental light source to provide additional lighting. A protective shield comprising a semi-rigid transparent sheet of acrylic is also attached to the interior of the top cover member. The protective shield is capable of rotating away from the top cover member from a closed position wherein the shield is entirely encased within the top cover member to an open position wherein the shield covers the computer screen to guard the computer from glares and debris. The protective shield is housed within a pair of side rails and is selectively slidable within these rails to cover the computer keyboard.

The present invention will become more fully apparent from the claims and description as it proceeds in connection with the drawings.

BRIEF DESCRIPTION OF THE DRAWINGS

FIG. 3 is a cross-sectional view of the carrying case taken along lines 3–3 of FIG. 2.

FIG. 3a is a partial breakaway of the carrying case showing an enlarged view of the wrist pad at its highest height position.

FIG. 4 is a cross-sectional view of the carrying case taken along lines 4—4 of FIG. 2.

FIG. 4a is an enlarged view of the lock and release mechanism of the present invention.

FIG. 5 is an exploded view of the lock and release mechanism of FIG. 4a.

FIG. 6 is a partial breakaway of the present invention with the lock and release mechanism in the locked position.

FIG. 7 is a partial breakaway of the present invention with the lock and release mechanism in the unlocked position.

FIG. 8 is a perspective view of the protective shield of the present invention with a portion of the top cover member shown in phantom.

FIG. 8a is a cross-sectional view taken along lines 8a–8a of FIG. 8.

FIG. 9 is partial breakaway of the top cover member with the protective shield and the guide bar.

FIG. 9a is an enlarged breakaway view of the top end of the guide bar of FIG. 9.

DETAILED DESCRIPTION OF THE PREFERRED EMBODIMENT

Figure 1:
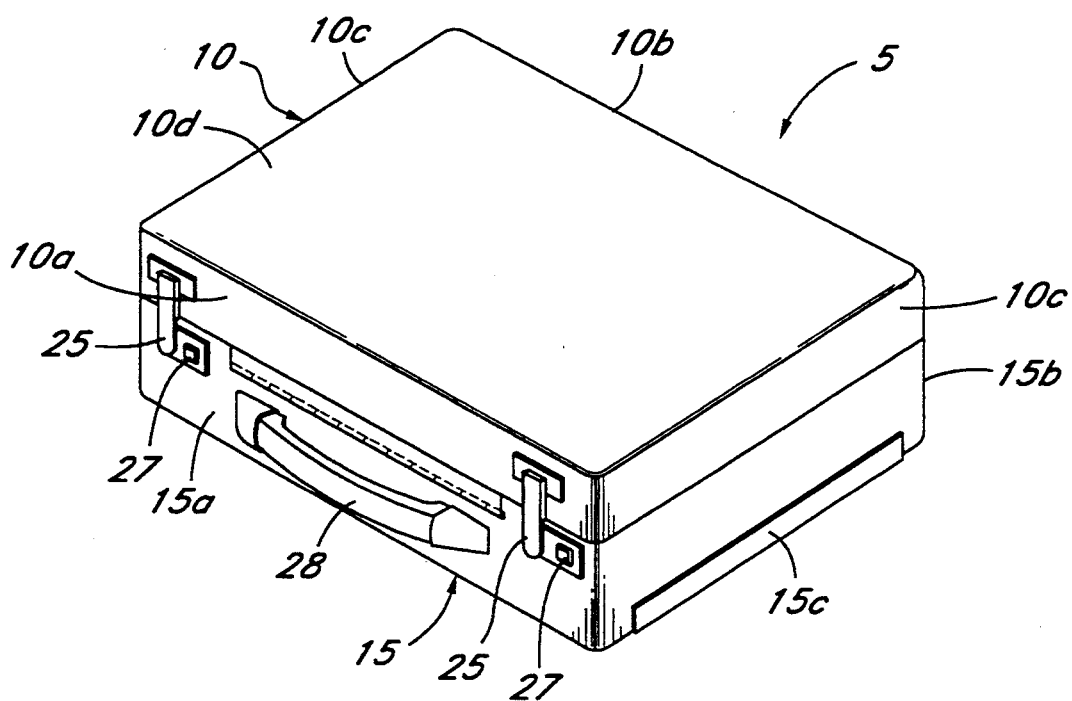
FIG. 1 is a perspective view of the multi-use notebook computer carrying case in the closed position.
Figure 2:
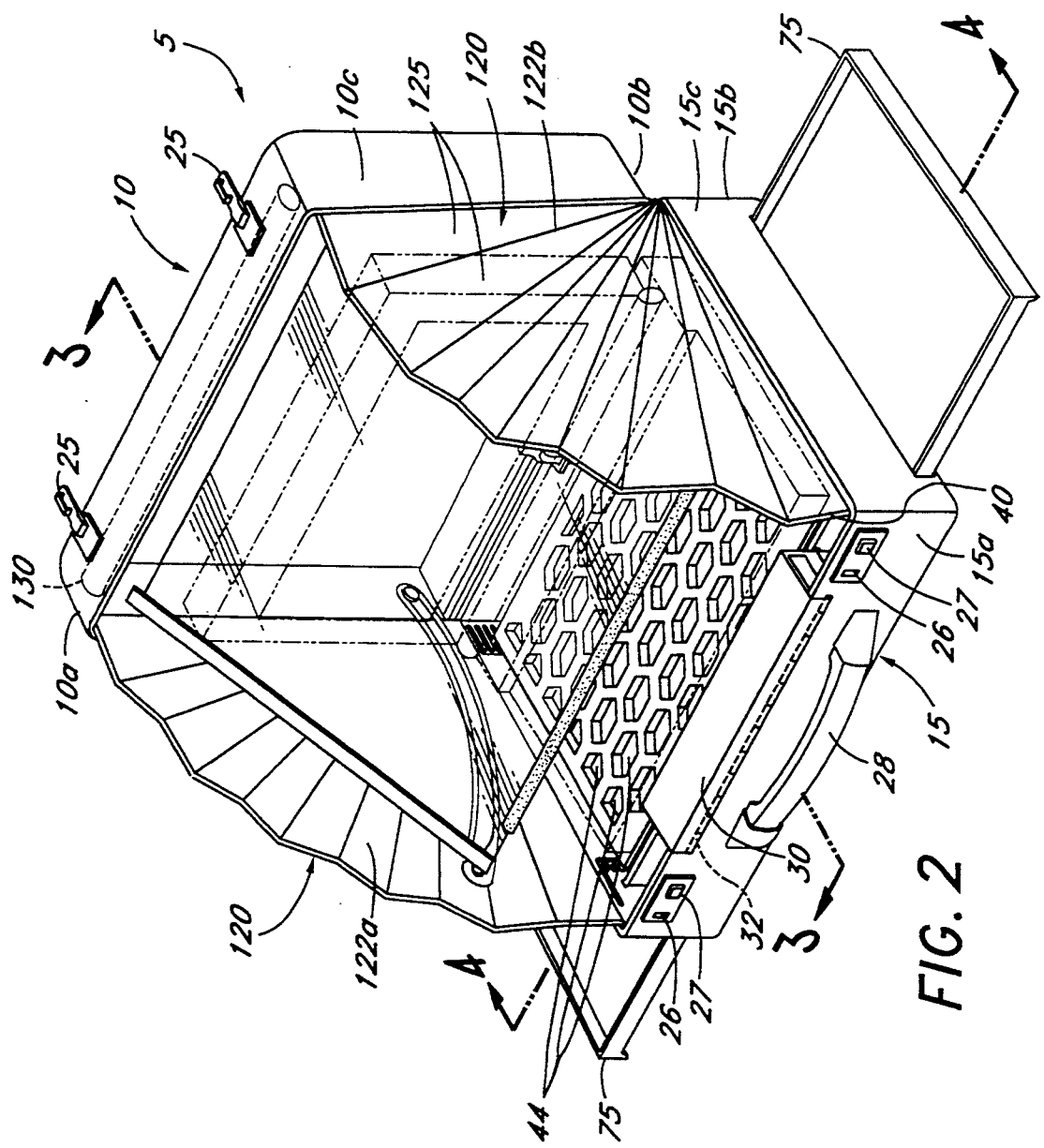
FIG. 2 is a perspective view of the carrying case of FIG. 1 in the open position with the notebook computer shown in phantom.

Referring to the drawings of FIGS. 1 and 2 in particular, a multi-use notebook computer carrying case 5 constructed in accordance with the present invention is illustrated. The carrying case includes a top cover member 10 and a bottom cover member 15. The top cover member comprises a front 10a, a back 10b, two sides 10c and a top 10d. The bottom cover member 15 likewise comprises a front 15a, a back 15b, a bottom (not shown) and two sides 15c. When the carrying case 5 is in an open position as shown in FIG. 2, it has the front 10a of the top cover member 10 displaced away from the front 15a of the bottom cover member 15. As shown in FIG. 1, the carrying case 5 in the closed position has the front 10a of the top cover member 10 adjacent the front 15a of the bottom cover member 15.

In this exemplary embodiment, the carrying case 5 is 12" high, 17" long and 5" thick. However, any dimensions may be suitable as long as the case 5 is large enough to house the particular notebook computer. The interior of the carrying case 5 is preferably coated with an electromagnetic and radio frequency shielding well known in the industry, such as a nickel-copper coating. This coating should aid the notebook computer user in abiding by any Federal Aviation Administration laws and regulations.

Referring to FIG. 3, the top and bottom cover members 10, 15 are connected along their respective back portions 10b, 15b by a standard hinge system 20 which allows the top cover member 10 to rotate to the open position along a horizontal axis located at the junction of the back portions 10b, 15b of the top and bottom cover members 10, 15.

Referring back to FIG. 2, the front 10a of the top cover member 10 contains two standard latches 25, well-known in the art. The front 15a of the bottom cover member 15 contains two openings 26 for receiving the latches 25 of the top cover member 10. As shown in FIG. 1, when the case 5 is closed, the latches 25 are inserted into the openings 26. Referring back to FIG. 2, two switches 27 located adjacent the openings 26 on the bottom cover member 15 selectively release the latches 25 from the openings 26. This latch system is well known in the art and allows for the selective locking of the carrying case 5.

The front 15a of the bottom cover member 15 contains a handle 28 for enabling the user to carry the case 5. The case may also have a supplemental shoulder strap (not shown) to aid the user in transporting the case 5.

The front 15a of the bottom cover member 15 further includes a double folding wrist pad 30. As shown in FIG. 3a, the pad 30 comprises a first rectangular member 31 connected to the front 15a of the bottom cover member 15 by a standard hinge 32. The side of the first rectangular member 31 distanced from the hinge 32 is connected to a second rectangular member 33 by a similar hinge 34. As shown in FIG. 3, in the closed position, the first rectangular member 31 is positioned on top of the second rectangular member 33 within the interior of the bottom cover member 15. In order to accommodate the thickness of the front 15a of the bottom cover member 15, the cross-sectional width of the second rectangular member 33 is smaller than the first rectangular member 31 so that in the closed position, the pad 30 is allowed to fold entirely within the bottom cover member 15. In opening the pad 30, the first rectangular member 31 along with the second rectangular member 33, swings outward of the bottom cover member 15 via the hinge 32. The pad 30 is double folding to enable the user to choose between two heights. The highest position of the pad 30 (as shown in FIG. 3a) has the second rectangular member 33 positioned on top of the first rectangular member 31 while both members 31, 33 are extended outward of the bottom cover member 15. The lower open height position of the pad 30 (not shown) has the second member 33 swung away from the top of the first member 31 via hinge 34 such that both members 31, 33 are positioned side by side to present a planar unit. The top sides of the first and second members 31, 33 as viewed from this lower position are cushioned by standard industry means (not shown) to aid in the user's comfort. However, the height of the cushion should not be excessive to allow for the proper folding of the pad 30.

The second rectangular member 33 and the first rectangular member 31 of the pad 30 contain channels on its sides which connects to interior chambers for housing pencil drawers 35, 35a. The drawers 35, 35a can house anything that will fit within its compartment. The drawers 35, 35a can slide along the channels from a closed position where the drawers 35, 35a are housed within the interior chambers of the first and second rectangular members 31, 33 of the pad 30 to an open position where the drawers 35, 35a are displaced away from the sides of the first and second rectangular members 31, 33 of the pad 30.

As shown in FIGS. 2, 3 and 4, the interior of the bottom cover member 15 contains a bottom tray 40 for the placement of the base of the notebook computer (shown in phantom in FIGS. 2 and 3). The bottom tray 40 comprises a front (not shown), a back (not shown) and two sides 43. The tray 40 comprises a substantially planar unit in a honeycomb configuration having a plurality of holes 44. In this particular embodiment, the holes 44 are hexagonal in shape; however, any shape will suffice as long as they are large enough so that the user's fingers can be inserted through the holes 44. Each side 43 of the bottom tray 40 contains a forward and a rear rod-like extension 45a and 45b. The extensions 45a, 45b are symmetrically located at the opposing ends of the sides 43 adjacent the front and back of the tray 40.

The interior of the front and back ends of the sides 15c of the bottom cover member 15 includes a series of forward and rear slots 55a, 55b. The slots 55a, 55b are positioned on the bottom cover member 15 in a reciprocal position with the extensions 45a, 45b of the tray 40. As shown in FIG. 3, the slots 55a, 55b are aligned along a vertical axis. The number of slots 55a, 55b aligned vertically may vary depending on the thickness of the case 5. The rear slots 55b are longer than the forward slots 55a. Further, the forward slots 55a are angled towards the top cover member 10 to aid in the repositioning of the tray 40 and provide more positive retention of the tray 40 in its various positions.

The honeycomb configuration of the tray 40 enables the user to manually position the extensions 45a, 45b of the tray 40 within the desired slots 55a, 55b. This particular system of linking the bottom tray 40 to the bottom cover member 15 enables the user to adjust the height of the keyboard of the notebook computer in four different areas. In practicality, the height of keyboard will only be adjusted in two different areas, the front and the back. The user in most instances will want the front extensions 45a the same height as each other and the rear extensions 45b to be the same height as each other, but the rear extensions 45b may be higher than the front extensions 45a to allow for tilt angle adjustment. Referring to FIG. 3, the extensions 45a, 45b engage the slots 55a, 55b to support the weight of the computer.

Referring to FIG. 4, the sides 15c of the bottom cover member 15 also contain channels 65 which extend through the sides 15c and into an interior compartment of the bottom cover member 15 for housing a plurality of drawers 75. As shown in FIGS. 3 and 4, a bottom wall 76 separates the bottom tray 40 from the drawers 75. The drawers 75 slide along the channels 65 from a closed position where the drawers 75 are housed within the interior of the bottom cover member 15 to an open position where the drawers 75 are distanced from the bottom cover member 15. As shown in FIG. 4, the side of the bottom wall facing the channels 65 contains a pair of projections 77 to limit the outward movement of the drawers 75. These drawers 75 are useful in holding pencils, disks or other material. The drawers 75 may also be replaced with leafs without compartments to provide an additional support surface.

Referring to FIGS. 4-7, a lock and release mechanism 80 is provided for maintaining the top cover member 10 in an upright position and for limiting the outward movement of the drawers 75 from the channels 65. A support member 82 parallel with the bottom of the bottom cover member 15 is attached to the rear interior of the bottom cover member 15. In this particular embodiment, the support member 82 contains a semi-circular hole 84 for the placement of a forked locking rod 86. Referring to FIG. 5, the top end of the rod 86 contains cam meshing teeth 88, while the bottom end contains a fork 90. The fork 90 is generally in the shape of an upside-down U having two prongs 92. When the forked rod 86 is in its unlocked position as shown in FIGS. 4a and 7, the prongs 92 are located within the compartment of each drawer 75 and adjacent the back walls 94 of the drawers 75. In the unlocked position, the drawers 75 are restrained from moving outward of the bottom cover member 15 because of the back walls 94 abutting the prongs 92. When the forked rod 86 is in its locked position as shown in FIG. 6, the prongs 92 are positioned above the back wall 94 of the drawers 75 and thus the drawers 75 are allowed to move outward of the bottom cover member 15.

Referring back to FIG. 5, a groove 96 extending substantially around the circumference of the rod 86 is located between the prongs 92 and the cam meshing teeth 88.

The support member 82 further includes a pair of latch retainers 98 on symmetrically opposed sides of the support member 82 for retaining a c-clip type sliding latch 100 adjacent the support member 82. One end of the latch 100 has a flange 102 for enabling the user to slide the latch 100 against the support member 82. The front side of the flange 102 has a pair of recesses or finger grips 104 generally in the shape of the fore finger and the middle finger. The back side of the flange 102 has a thumb recess (not shown) located between the finger grips 104. This flange 102 allows for the pushing and pulling of the latch 100. The middle portion of the latch 100 has a hole 106 for mating with the rod 86. The hole 106 is substantially the same size or slightly smaller than the circumference of the rod 86. The hole 106 leads to a flared opening having two flared prongs 108. The ends of the flared prongs 108 distanced from the flange 102 contains locking projections 110 for limiting the sliding movement of the latch 100 away from the support member 82.

As shown in FIGS. 6 and 7, a cam 112 is located on the interior side of the hinge system 20 linking the top cover member 10 and the bottom cover member 15. The cam 112 is well known in the art and has a plurality of recesses for mating with the cam meshing teeth 88 of the forked rod 86. The top portion of the cam 112 is integral with the top cover member 10 such that movement of the top cover member 10 causes the cam 112 to follow. Initially in the unlocked position, the latch 100 is positioned away from the forked rod 86 as shown in FIG. 7, allowing for the unrestrained movement of the rod 86. However, when the case 5 is opened as shown in FIG. 6, by rotating the top cover member 10 away from the bottom cover member 15, the cam 112 rotates along with the top cover member 10. This causes the rod 86 to be pulled up via the connection between the cam 112 and the cam meshing teeth 88 of the rod 86. If this open position is desired to be maintained, the user can push the latch 100 towards the back 15b of the bottom cover member 15 inserting the flared prongs 108 within the groove 96 of the rod 86 thereby locking the case 5 in the open position.

As shown in FIGS. 2 and 3, the sides 10c of the top cover member 10 are connected to the respective sides 15c of the bottom cover member 15 via an accordion-like shroud 120. The accordion-like shroud 120 includes two side portions having an interior side 122a facing the computer and an exterior side 122b facing away from the computer.

Each of the side portions 122a, 122b of the accordion-like shroud 120 comprises an integral series of substantially planar triangle-like bellows 125. The junction between each bellow 125 is bendable so that as the case 5 is opened and closed, this junction angle will constantly change. When the case 5 is in its fully open position, the junction angle at the interior sides 122a of the side portions 122 is approximately 180° so as to create a substantially planar unit. As the top cover member 10 is lowered to its closed position, the junction angle at the interior sides 122a decreases from 180° to 0° in the fully closed position. In the fully closed position, the closed shroud 120 lies entirely within the top cover member 10 and the bottom cover member 15 as shown in FIG. 1. In the open position, the shroud 120 helps prevent sun-glare and blocks the view of adjacent passengers in an airplane, or the like.

The preferred embodiment of the present invention has a light source 130 attached to the interior of the front side 10a of the top cover member 10 as shown in FIG. 3. The light source 130 may be a low-power fluorescent tube, an incandescent lamp, or another suitable low-voltage light source. The light source 130 can be attached by any suitable means such as a velcro strap. Further, the light source 130 can be powered by any suitable means such as a battery pack or a separate adaptor which plugs directly into the computer. Supplemental lighting proves very useful in dimly lit areas.

Referring to FIGS. 8-9, a pair of side rails 140 with interior channels having a top end 142 connected to the interior sides 10c of the top cover member 10 via pivot pins 144. The pivot pins 144 allow the rails 140 to rotate about this point on the top cover member 10. The bottom ends 146 of the rails 140 contain knobs 148.

A protective windshield 150 comprising a semi-rigid, yet transparent sheet of acrylic or other suitable material, is housed within the channels of the rails 140 as shown in FIG. 8a. It is possible to have the shield 150 tinted, polarized, and/or metal film coated by any standard industry means to reduce the amount of glare from the sun and provide supplemental EMI/RFI shielding. The interior of the channels are coated with velveteen-like material (not shown) or any other suitable material to ease the movement of the shield 150 relative to the rails 140. The shield 150 is capable of sliding outward of the channels from a position covering only the computer screen to a position covering a substantial portion of the computer keyboard. The bottom edge 152 of the shield 150 distanced from the pivot pins 144 has a cushion-like material 154 adhesively attached to protect the user's hands from the bottom edge 152 of the shield 150. This windshield 150 will help protect the computer in a hazardous environment. Additionally, a supplemental transparent flexible material (not shown) well known in the art, such as a thin film of plastic may extend around the periphery of the windscreen 150, and through which the user's hands may extend to the keyboard by means of slits or isolation chamber-like gloves well known in the art. This will provide a more positive seal when used in extremely hazardous environments.

As shown in FIGS. 3, 8 and 9, the bottom ends 156 of a pair of guide bars 158 distanced from the pivot pin 144 are attached to the interior side of the top cover member 10 via a pivot assembly 160. The pivot assembly 160 allows the guide bars 158 to rotate about this point. Referring back to FIGS. 8, 9 and 9a, in the preferred embodiment, the guide bars 158 are arced with a radius of curvature in the range of 1.0-1.5 feet. The guide bars 158 contain an elongated opening 162 for receiving the knobs 148 of the rails 140. The knobs 148 are selectively slidable along the elongated opening 162 from the bottom end 156 of the guide bar 158 to the front end 164. The front end 164 of the guide bars 158 contains a plurality of recesses 166 along the elongated opening 162 for selective locking of the knob 148. In this particular embodiment, there are four recesses. The placement of the knob 148 in a particular recess 166 determines the angle of the shield 150 in relation to the top cover member 10. The exterior of the front end 164 of the guide bar 158 contains a locking slot 168 for engagement with the pivot pin 144 when the shield 150 is not in use. In a closed position (not shown), the shield 150, the rails 140 and the guide bars 158 are all housed within the interior of the top cover member 10. When the shield 150 is in use, as shown in FIG. 3, the shield 150, rails 140 and guide bars 158 all extend outward from the top cover member 10.

In operation, when the user desires to use the notebook computer, the user will initially open the latch mechanism located in the front of the carrying case 5. This enables the front 10a of the top cover member 10 to swing away from the front 15a of the bottom cover member 15 to expose the notebook computer. The accordion-like shroud 120 expands during this lifting movement so that the junction angle on the interior side of the shroud 120 will change from 0° to 180°. In the open position, the shroud 120 has a substantially planar configuration.

The lifting movement further causes the forked rod 86 to rise releasing the drawers 75 from their locked position. Once the top cover member 10 is in the fully open position, the user can grab the thumb recess and the finger grips 104 to slide the latch 100 inward towards the back of the case 5. This movement will cause the flared prongs 108 to engage the groove 96 on the rod 86 and lock the rod 86 in an open position so that the top cover member 10 will not close inadvertently. The user then unfolds the wrist pad 30 located in the front 15a of the bottom cover member 15 to the desired height. Then, any of the drawers 75 may be extended or opened to retrieve any materials needed and use as additional working surface area.

The user may then adjust the height of the keyboard of the notebook computer by removing the computer and manually maneuvering the tray 40 to the desired height by inserting fingers in the holes 44 of the tray 40 and pushing the tray 40 towards the back 15b of the bottom cover member 15 releasing the forward extensions 45a of the tray 40 from the forward slots 55a. The user may then lift the front end of the tray 40, rotating the tray 40 about the rear extensions 45b. Once the forward extensions 45a are clear of the forward slots 55a, the rear extensions 45b of the tray 40 may be pulled out of the rear slots 55b freeing the tray 40 from the bottom cover member 15. To reposition the tray 40 to the desired height, the foregoing steps may be repeated in a reverse manner to any particular slot as described above.

If necessary, the light source 130 located on the interior of the top cover member 10 may be turned on. Further, once the computer screen is raised, the protective windshield 150 can be utilized if needed. The user will initially unlock the front ends 164 of the guide bars 158 by pulling the locking slots 168 away from the pivot pins 144. Then the bottom end 152 of the shield 150 can be rotated outward of the top cover member 10 via the pivot pin 144. This rotation will cause the knobs 148 to slide along the elongated openings 162 of the guide bars 158 while the guide bars 158 rotate about the pivot assemblies 160. Once the desired angle of the shield 150 is achieved, the knobs 148 can be inserted and locked into the particular recess 166. Then if needed, the shield 150 can be slid down and out of the channels of the rails 140 to the desired height. The notebook computer is now ready for use and protected against any of the disadvantages stated earlier.

What is claimed is:

1. A multi-use notebook computer carrying case for carrying a notebook computer, said notebook computer having a closed position in which said notebook computer cannot be operated and an open position in which said notebook computer can be operated, said carrying case comprising:

a top cover member;

a bottom cover member to receive said notebook computer so that said notebook computer is positioned within said bottom cover member;

a plurality of side members connecting said top cover member to said bottom cover member, wherein said top cover member, said bottom cover member, and said plurality of side members define an unobstructed opening that allows said notebook computer to be operated in said open position, and wherein said plurality of side members shield said notebook computer from observation; and a wrist pad movably attached to said carrying case, said wrist pad providing support for a user's wrists when using said notebook computer, said wrist pad having a closed position and an open position, said wrist pad in said closed position being positioned within said carrying case, said wrist pad in said open position being extended outside said carrying case.

2. The carrying case of claim 1, wherein said side members comprise an accordion-like shroud.

3. The carrying case of claim 1, wherein said bottom cover member further includes a plurality of drawers.

4. The carrying case of claim 1, wherein said bottom cover member further includes a wrist pad, said wrist pad comprising a substantially planar surface for supporting a person's wrists.

5. A multi-use notebook computer carrying case comprising:

a top cover member;

a bottom cover member to receive a notebook computer so that said notebook computer is positioned within said bottom cover member;

a plurality of side members connecting said top cover member to said bottom cover member to shield said notebook computer from observation, wherein said side members comprise an accordion-like shroud; and a semi-rigid transparent sheet of plastic attached to said top cover member.

6. The carrying case of claim 5, wherein one end of said sheet of plastic is selectively rotatable away from said top cover member to shield said computer from the effects of the environment.

7. A multi-use notebook computer carrying case comprising:

a top cover member;

a bottom cover member to receive a notebook computer so that said notebook computer is positioned within said bottom cover member;

a plurality of side members connecting said top cover member to said bottom cover member to shield said notebook computer from observation; and a tray for the placement of a notebook computer wherein said tray is connected to said bottom cover member by a height adjustment mechanism.

8. The carrying case of claim 7, wherein said height adjustment mechanism includes a plurality of extensions mating with a plurality of slots located on said bottom cover member said slots having a plurality of recesses arranged along a vertical axis.

9. A multi-use notebook computer carrying case comprising:

a top cover member;

a bottom cover member to receive a notebook computer so that said notebook computer is positioned within said bottom cover member, wherein said bottom cover member further includes a plurality of drawers, and wherein said bottom cover member further includes a locking and releasing mechanism for locking said top cover member in an upright position and for releasing said drawers from a closed position; and a plurality of side members connecting said top cover member to said bottom cover member to shield said notebook computer from observation.

10. A multi-use carrying case for a notebook computer comprising:

a top cover member;

a bottom cover member;

a tray positioned in said bottom cover member for receiving said notebook computer thereon; and a wrist pad movably attached to said bottom cover member, said wrist pad having a substantially planar surface for supporting a person's wrists, said wrist pad having a closed position and an open position, said wrist pad in said closed position being positioned within said carrying case, said wrist pad in said open position being extended outside said carrying case.

11. The carrying case of claim 10, wherein said tray includes a plurality of extensions which mate with a plurality of recesses located in the bottom cover member for selective height adjustment.

12. A multi-use carrying case for a notebook computer comprising:

a top cover member;

a bottom cover member, wherein said top cover member and said bottom cover member are connected by an accordion-like shroud; and a tray positioned in said bottom cover member for receiving said notebook computer thereon, said tray having a height adjust mechanism.

13. A multi-use carrying case for a notebook computer comprising:

a top cover member;

a bottom cover member;

a tray positioned in said bottom cover member for receiving said notebook computer thereon, said tray having a height adjust mechanism; and a semi-rigid transparent sheet of plastic attached to said top cover member and selectively rotatable away from said top cover member to shield said computer.

14. The carrying case of claim 10, wherein said bottom cover member includes a plurality of grooves for the placement of drawers.

15. A multi-use carrying case for a notebook computer comprising:

a top cover member;

a bottom cover member, wherein said bottom cover member includes a plurality of grooves for the placement of drawers;

a tray positioned in said bottom cover member for receiving said notebook computer thereon, said tray having a height adjust mechanism; and a locking and release mechanism comprising a forked rod and a sliding latch for locking said top cover member in an upright position and for releasing said drawers from a closed position.

16. A multi-use carrying case for a notebook computer comprising:

a top cover member;

a bottom cover member that receives a notebook computer therein so that said notebook computer is positioned within said bottom cover member;

an accordion-like shroud connecting said top cover member to said bottom cover member to shield said notebook computer from observation; and a tray located within said bottom cover member containing a plurality of extensions which mate with a plurality of recesses on said bottom member to selectively adjust the height of said notebook computer.

17. The carrying case of claim 16, further comprising a semi-rigid transparent sheet of plastic attached to said top cover member and selectively rotatable away from said top cover member to shield said computer.

18. The carrying case of claim 16, wherein said bottom cover member includes a plurality of grooves for the placement of extendable drawers.

19. The carrying case of claim 18, further including a lock and release mechanism comprising a forked rod and a sliding latch for locking said top cover member in an upright position and for releasing said drawers from a closed position.

20. A multi-use carrying case for a notebook computer comprising:

a top cover member;

a bottom cover member that receives a notebook computer therein so that said notebook computer is positioned within said bottom cover member;

an accordion-like shroud connecting said top cover member to said bottom cover member to shield said notebook computer from observation;

a tray located within said bottom cover member containing a plurality of extensions which mate with a plurality of recesses on said bottom member to selectively adjust the height of said notebook computer; and a semi-rigid transparent sheet of plastic attached to said top cover member and selectively rotatable away from said top cover member to shield said computer.

21. The carrying case of claim 20, wherein said bottom cover member includes a plurality of grooves for the placement of extendable drawers.

22. The carrying case of claim 21, further including a lock and release mechanism comprising a forked rod and a sliding latch for locking said top cover member in an upright position and for releasing said drawers from a closed position.

* * * * *